United States Patent [19]

Suzuki et al.

[11] 4,045,399

[45] Aug. 30, 1977

[54] CURABLE AQUEOUS COATING COMPOSITION

[75] Inventors: Hiroo Suzuki; Isao Takada, both of Tokyo, Japan

[73] Assignee: Toyo Ink Mfg. Co., Ltd., Tokyo, Japan

[21] Appl. No.: 653,867

[22] Filed: Jan. 30, 1976

[51] Int. Cl.$^2$ .............................................. C08L 33/02
[52] U.S. Cl. ..................... 260/29.6 N; 260/29.4 UA; 260/29.6 TA
[58] Field of Search ................ 260/29.6 N, 29.6 TA, 260/29.4 UA

[56] References Cited

U.S. PATENT DOCUMENTS

| 3,215,647 | 11/1965 | Dunn | 260/23 R |
| 3,352,806 | 11/1967 | Hicks | 260/29.6 N |
| 3,650,995 | 3/1972 | Erickson | 260/29.6 N |

FOREIGN PATENT DOCUMENTS

| 119,028 | 9/1975 | Japan | 260/29.6 N |

*Primary Examiner*—M. J. Welsh
*Attorney, Agent, or Firm*—Sughrue, Rothwell, Mion, Zinn and Macpeak

[57] ABSTRACT

A curable aqueous coating composition in which dicyandiamide or a salt of guanidine is mixed and dissolved in an aqueous solution of a salt of a copolymer of an acrylic monomer mixture containing an unsaturated carboxylic acid monomer and a hydroxyalkyl acrylate or methacrylate monomer.

6 Claims, No Drawings

CURABLE AQUEOUS COATING COMPOSITION

BACKGROUND OF THE INVENTION

1. Field of the Invention

This invention relates to a curable aqueous coating composition which can form a coating having high hardness and excellent water resistance.

2. Description of the Prior Art

In general, curable water-soluble acrylic resin coating compositions are prepared by adding an unsaturated carboxylic acid to monomer components, copolymerizing them to obtain a resin, converting the resin into an amine salt thereof to render the resin water-soluble and then mixing the salt of the resin with a water-soluble aminoplast resin, such as a methylol-melamine resin and methylol-urea resin which are made using formaldehyde. When a coating composition of this type is subjected to baking, a condensation reaction takes place between hydroxyl groups or carboxyl groups in the copolymer and the water-soluble aminoplast resin to form a three-dimensionally cured coating film which is excellent in hardness, water resistance and solvent resistance. However, these compositions are disadvantageous in that large amounts of formaldehyde are released on curing by heating.

SUMMARY OF THE INVENTION

This invention provides a curable aqueous coating composition used for paints which is free from the above defect. The inventors studied curable coating compositions which are water-soluble, do not release formaldehyde on baking and which form a coating film having properties nearly equal to those of the films formed using aminoplast resins. As a result, we found that dicyandiamide and/or a salt of guanidine can be mixed and dissolved in an aqueous solution of a water-soluble salt of a copolymer obtained by copolymerizing a monomer mixture comprising an acrylic monomer in combination with an unsaturated carboxylic acid and an unsaturated hydroxyl group-containing monomer, and the resulting composition does not release formaldehyde upon baking and exhibits the same effects as in the case of using an aminoplast resin.

DETAILED DESCRIPTION OF THE INVENTION

This invention provides a thermosetting aqueous coating composition obtained by mixing and dissolving dicyandiamide and/or a water soluble salt of guanidine in an aqueous solution of a water-soluble salt of a copolymer comprising about 5 to about 30 wt% of one or more unsaturated carboxylic acid monomers, about 10 to about 50 wt% of one or more hydroxyalkyl (alkyl $C_{2-8}$) acrylate or methacrylate monomers and about 20 to about 85 wt% of one or more alkyl ($C_{1-18}$) acrylate monomers, where the content of the dicyandiamide and/or the water soluble salt of guanidine is about 0.10 to about 1.0 mol equivalent per 1 mol of hydroxyl group containing monomers in the copolymer.

The acrylic monomer is the predominant component in the composition of this invention. Typical curable aqueous coating compositions of this invention comprise about 5 to about 30% by weight of unsaturated carboxylic acid monomers, about 10 to about 50% by weight of one or more hydroxyalkyl acrylates or methacrylates, about 20 to about 80% by weight of one or more alkyl acrylates or methacrylates, and 0.1 to 1.0 mol (per 1 mol of OH groups in the hydroxyalkyl acrylates or methacrylates) of a dicyandiamide and/or a guanidine salt.

The unsaturated carboxylic acid monomers used in this invention include acrylic acid, methacrylic acid, itaconic acid, fumaric acid, maleic acid, citraconic acid and mixtures thereof and anhydrides thereof, and the like. A suitable amount thereof is about 5 to about 30 wt% based on the total copolymerizable monomers. The use of less than about 5 wt% is insufficient to render the resulting resin water-soluble, while, on the other hand, the use of more than about 30 wt% shows an undesirable effect on water resistance.

Examples of the hydroxyalkyl acrylate or methacrylate are 2-hydroxyethyl acrylate or methacrylate, 2-hydroxypropyl acrylate or methacrylate, 2-hydroxybutyl acrylate or methacrylate, 3-hydroxypropyl acrylate or methacrylate, 2-hydroxydodecyl acrylate or methacrylate, 6-hydroxyhexyl acrylate or methacrylate, 2,3-dihydroxypropyl acrylate or methacrylate, diethylene glycol monoacrylate or monomethacrylate, triethylene glycol monoacrylate or monomethacrylate, and dipropylene glycol monoacrylate or monomethacrylate. The amount thereof is about 2 to about 30 wt%, preferably 10 to 30 wt%, based on the total copolymerizable monomers. The use of less than about 10 wt% results in low curing density with dicyandiamide or a salt of guanidine, and does not show a large effect on hardness. However, the use of less than about 10 wt%, if it is about 2 wt% or more, can afford a coating film insufficient in hardness but having good water resistance, which can be used in the case that there is no particular requirement for hardness. On the other hand, with the use of more than 50 wt%, dicyandiamide or a salt of guanidine to be mixed and dissolved for reaction therewith cannot be dissolved up to the required amount, since there is a limit in the solubility of the dicyandiamide or the salt of guanidine, and, therefore, water resistance is adversely affected.

A suitable amount of dicyandiamide or a salt of guanidine is about 0.1 to about 1.0 mol equivalent per 1 mol of the hydroxyl group-containing monomer used. With the use of less than about 0.1 mol equivalent, unreacted functional groups are left in large amounts after heating, resulting in poor water resistance. On the other hand, the use of more than about 1.0 mol equivalent does not show a remarkable effect for improving the properties of a coating film and rather deteriorates the same. The salts of guanidine used include the carbonate, nitrate, hydrochloride and other salts thereof. It should be understood, of course, that the salts of guanidine are not limited to the above salts, and other salts can be used so long as they are water soluble. Mixtures of such salts can also be used, if desired.

Suitable other copolymerizable monomers are alkyl esters of acrylic acid or methacrylic acid. Examples of other copolymerizable alkyl acrylates and methacrylates which can be used are ethyl, propyl, butyl, hexyl, octyl, 2-ethylhexyl, decyl, dodecyl or octadecyl acrylates and methacrylates or mixtures thereof. They can be used in combination as mixtures thereof, and other copolymerizable unsaturated monomers such as an epoxy-containing acryl ester monomer and styrene can be copolymerized therewith to modify the resulting resin, especially when particular properties are required in the coating obtained from the coating composition of this invention, e.g., improved adhesive strength or antiblocking properties, or when it is desired to reduce the production cost of the coating compositions. The maximum proportion of such other copolymerizable monomers which can be present is about 50% by weight of the total monomers present.

The composition of this invention can be prepared by copolymerization by a conventional solution polymerization method (for example, a procedure as described in Example 1) in which water and a hydrophilic organic solvent such as alcohols or alcohol ethers, e.g., methyl alcohol, ethyl alcohol, n-propyl alcohol, isopropyl alcohol, butyl alcohol, ethylene glycol monobutyl ether and the like are used and the resulting copolymer is neutralized and solubilized with an amine such as aqueous ammonia, ethanolamine, dimethylaminoalcohol and diethylaminoethanol, and then mixing and dissolving a predetermined amount of dicyandiamide or a salt or guanidine in the form of a solid in the resulting resin composition.

The aqueous coating composition of the invention can be cured by hot-air treating (flowing at a rate of more than about 1 m/sec) at about 170° C to 180° C for 10 min. or more without releasing formaldehyde since it contains no methylol groups, and thus can be used as a coating agent for metal plates such as tin plates, treated steel plates and aluminum plates to form a coating film excellent in hardness, water resistance and solvent resistance. In such instances, it is most preferred that the composition of the present invention be coated with thickness of from about 5 to about 50 $\mu$, more preferably 5 to 20 $\mu$, dry basis.

The aqueous coating composition of this invention can also be used as a top coating as a clear paint, or as a color coating agent after an inorganic or organic pigment is added thereto. Generally, the amount of organic and/or inorganic pigment added is less than about 200% by weight based on the solids content (resin content) of the coating composition of the present invention.

The following examples further illustrate this invention without limiting the same.

EXAMPLE 1

| (1) | Methyl methacrylate | 20.0 g |
|---|---|---|
| | Ethyl acrylate | 10.0 g |
| | $\beta$-hydroxyethyl methacrylate | 10.0 g |
| | Acrylic acid | 10.0 g |
| (2) | Water | 10.0 g |
| | Ethylene glycol monobutyl ether | 40.0 g |
| (3) | Azobisisobutyronitrile | 3.0 g |
| (4) | Dimethylaminoalcohol | 8.0 g |
| | Total: | 111.0 g |

The above components (2) were placed in a flask saturated with nitrogen gas at atmospheric pressure, and then the temperature was raised to 85° to 95° C. Thereafter, all of component (1) and ½ of component (3) which had been placed in a dropping funnel were dropwise added over 3 hours. After the completion of the addition, ¼ of the component (3) was added at the fourth hour of the reaction and the last one quarter of component (3) was added at the fifth hour of the reaction. The reaction was concluded after about 6 hours. The temperature was then lowered to 40° C and component (4) was added.

5.0 g of dicyandiamide was then mixed and dissolved in 111 g of the resuting resin composition with stirring (no particular conditions are necessary to effect the mixing and dissolution), and the viscosity was adjusted to 80 ± 5 sec (as measured at 25° C with No. 4 F.C.) using water to obtain an aqueous coating composition.

EXAMPLE 2

| (1) | Butyl methacrylate | 21.5 g |
|---|---|---|
| | $\beta$-hydroxyethyl acrylate | 25.0 g |
| | Methacrylic acid | 3.5 g |
| (2) | Water | 10.0 g |
| | Isopropyl alcohol | 40.0 g |
| (3) | Azobisisobutyronitrile | 3.0 g |
| (4) | Dimethylaminoalcohol | 5.0 g |
| | Total: | 108.0 g |

In 108 g of a resin composition prepared from the above components in the same manner as in Example 1, 6.0 g of dicyandiamide was mixed and dissolved, and then viscosity adjustment effected in the same manner as in Example 1.

EXAMPLE 3

| (1) | Styrene | 15.0 g |
|---|---|---|
| | Butyl methacrylate | 15.0 g |
| | $\beta$-hydroxypropyl methacrylate | 5.0 g |
| | Acrylic acid | 15.0 g |
| (2) | Water | 10.0 g |
| | Ethylene glycol monobutyl ether | 40.0 g |
| (3) | Azobisisobutyronitrile | 3.0 g |
| (4) | Dimethylaminoalcohol | 10.0 g |
| | Total: | 113.0 g |

In 113 g of a resin composition prepared from the above components in the same manner as in Example 1, 2.9 g of dicyandiamide was mixed and dissolved, and then viscosity adjustment was effected in the same manner as in Example 1.

EXAMPLE 4

| (1) | Methyl methacrylate | 10.0 g |
|---|---|---|
| | Butyl acrylate | 10.0 g |
| | $\beta$-hydroxypropyl acrylate | 20.0 g |
| | Itaconic acid | 10.0 g |
| (2) | Water | 10.0 g |
| | Ethylene glycol monobutyl ether | 40.0 g |
| (3) | Azobisisobutyronitrile | 3.0 g |
| (4) | Dimethylaminoalcohol | 8.0 g |
| | Total: | 111.0 g |

In 111 g of a resin composition prepared from the above components in the same manner as in Example 1, 5.0 g of dicyandiamide was mixed and dissolved, and then viscosity adjustment was effected in the same manner as in Example 1.

EXAMPLE 5

| (1) | Butyl methacrylate | 28.0 g |
|---|---|---|
| | $\beta$-hydroxyethyl methacrylate | 10.0 g |
| | Glycidyl methacrylate | 2.0 g |
| | Acrylic acid | 10.0 g |
| (2) | Water | 10.0 g |
| | Ethylene glycol monobutyl ether | 40.0 g |
| (3) | Azobisisobutyronitrile | 3.0 g |
| (4) | Dimethylaminoalcohol | 8.0 g |
| | Total: | 111.0 g |

In 111 g of a resin composition prepared from the above components in the same manner as in Example 1, 0.7 g of dicyandiamide was mixed and dissolved, and then viscosity adjustment was effected in the same manner as in Example 1.

EXAMPLE 6

In 111 g of the same resin as was used in Example 1, 3.0 g of guanidine carbonate was mixed and dissolved therein instead of dicyandiamide, and then viscosity adjustment was effected in the same manner as in Example 1.

EXAMPLE 7

In 108 g of the same resin as was used in Example 2, 5 g of guanidine hydrochloride was mixed and dissolved, and then viscosity adjustment was effected in the same manner as in Example 1.

EXAMPLE 8

| (1) | Methyl methacrylate | 20.0 g |
|---|---|---|
| | Ethyl acrylate | 10.0 g |
| | 2-hydroxyethyl methacrylate | 5.0 g |
| | 2-hydroxypropyl methacrylate | 5.0 g |
| | Methacrylic acid | 10.0 g |
| (2) | Water | 10.0 g |
| | Ethylene glycol monobutyl ether | 40.0 g |
| (3) | Azobisisobutyronitrile | 3.0 g |
| (4) | Dimethylaminoalcohol | 9.0 g |
| | Total: | 112.0 g |

In 112 g of a resin composition prepared from the above components in the same manner as in Example 1, 6 g of dicyandiamide was mixed and dissolved, and then viscosity adjustment was effected in the same manner as in Example 1.

COMPARATIVE EXAMPLE 1

A composition was prepared according to the recipe of Example 1 except dicyandiamide was not used.

COMPARATIVE EXAMPLE 2

A composition was prepared according to the recipe of Comparative Example 1 plus further by mixing and dissolving 15 g of hexamethoxymethylolmelamine therein.

COMPARATIVE EXAMPLE 3

| (1) | Butyl methacrylate | 25.0 g |
|---|---|---|
| | Butyl acrylate | 12.5 g |
| | N-butoxymethylolacrylamide | 5.0 g |
| | Acrylic acid | 7.5 g |
| (2) | Water | 10.0 g |
| | Ethylene glycol monobutyl ether | 40.0 g |
| (3) | Azobisisobutyronitrile | 3.0 g |
| (4) | Dimethylaminoalcohol | 8.0 g |
| | Total: | 111.0 g |

A resin composition prepared from the above components in the same manner as in Example 1 was subjected to viscosity adjustment in the same manner as in Example 1 except that in this case dicyandiamide was not added.

Films were obtained by coating the compositions as described in the above Examples and Comparative Examples on a tin plate of 50/50 ET 85 lbs to provide a solid film thickness of 6 to 7 μ by means of a bar coater and subjecting the resulting coated plate to hot air (flow rate: 1 m/sec) treatment at 180° C for 10 minutes. The properties of the resulting films are set forth in the following table.

| | Amount of Formaldehyde Released on Baking (per 1 g of paint) | Pencil Hardness of Film | Water Resistance of Film (immersion at 100° C for 60 min) | Solvent Resistance (number of rubbings with MEK*) |
|---|---|---|---|---|
| Example 1 | 0 | 3H | ○ | 100 times |
| 2 | 0 | 3H | ○ | 100 |
| 3 | 0 | 2H | ○ | 100 |
| 4 | 0 | 2H – 3H | ○ | 100 |
| 5 | 0 | 2H – 3H | ○ | 100 |
| 6 | 0 | 2H – 3H | ○ | 100 |
| 7 | 0 | 2H – 3H | ○ | 100 |
| 8 | 0 | 2H – 3H | ○ | 100 |
| Comparative Example 1 | 0 | B | X | 5 |
| 2 | 0.05–0.06 mg | 2H – 3H | ○ | 50 |
| 3 | 0.01–0.02 mg | F – H | ○ – Δ | 8 |

*Methyl Ethyl Ketone

Note:
1. The amount of formaldehyde released on baking was quantitatively determined using an acetyl acetone indicator after dissolving the released formaldehyde in 500 cc of water.
2. As to water resistance, ○ shows "good", Δ "slightly poor", and X "poor".
3. Solvent resistance was expressed as the number of rubbings with an absorbent cotton soaked with MEK until the film peeled off.

While the invention has been described in detail and with reference to specific embodiments thereof, it will be apparent to one skilled in the art that various changes and modifications can be made therein without departing from the spirit and scope thereof.

What is claimed is:

1. A curable aqueous coating composition comprising dicyandiamide and/or a water soluble salt of guanidine dissolved in an aqueous solution of a water soluble salt of a copolymer comprising about 5 to about 30 wt% of one or more unsaturated carboxylic acid monomers, about 10 to about 50 wt% of one or more hydroxyalkyl (alkyl carbons: 2-8) acrylate or methacrylate monomers and about 20 to about 85 wt% of one or more ($C_1$-$C_{18}$) alkyl acrylate monomers, where the amount of the dicyandiamide and/or the water soluble salt of guanidine is about 0.1 to about 1.0 mol equivalent per 1 mol of hydroxyl group containing monomers in the copolymer.

2. A composition as defined in claim 1, wherein the hydroxyalkyl acrylate or methacrylate is 2-hydroxyethyl acrylate or 2-hydroxyethyl methacrylate.

3. A composition as defined in claim 1, wherein the hydroxyalkyl acrylate or methacrylate is 2-hydroxypropyl acrylate or 2-hydroxypropyl methacrylate.

4. A composition as defined in claim 1, wherein the hydroxyalkyl acrylate or methacrylate is a combination of (1) 2-hydroxyethyl acrylate or 2-hydroxyethyl methacrylate with (2) 2-hydroxypropyl acrylate or 2-hydroxypropyl methacrylate.

5. A composition as defined in claim 1, wherein the salt of guanidine is guanidine carbonate or guanidine hydrochloride.

6. A composition as defined in claim 1, wherein the unsaturated carboxylic acid is acrylic acid, methacrylic acid or itaconic acid.

* * * * *